(12) United States Patent
Cho et al.

(10) Patent No.: US 9,829,115 B2
(45) Date of Patent: Nov. 28, 2017

(54) VALVE

(71) Applicants: Hyundai Motor Company, Seoul (KR); Kia Motors Corporation, Seoul (KR)

(72) Inventors: WanJe Cho, Hwaseong-si (KR); JaeYeon Kim, Hwaseong-si (KR); YongJeong Kim, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 409 days.

(21) Appl. No.: 14/509,890

(22) Filed: Oct. 8, 2014

(65) Prior Publication Data

US 2016/0103456 A1    Apr. 14, 2016

(51) Int. Cl.
| | |
|---|---|
| *F16K 31/00* | (2006.01) |
| *F16K 11/065* | (2006.01) |
| *G05D 23/02* | (2006.01) |
| *F16K 11/07* | (2006.01) |

(52) U.S. Cl.
CPC ........ *F16K 31/002* (2013.01); *F16K 11/0716* (2013.01); *G05D 23/025* (2013.01)

(58) Field of Classification Search
CPC ...... F16K 31/002; F16K 11/065; F16K 17/38; G05D 23/025; G05D 23/08; F02M 1/10
USPC ........ 236/101 R, 101 D, 101 A, 93 R, 12.11
See application file for complete search history.

(56) References Cited

U.S. PATENT DOCUMENTS

| | | | | |
|---|---|---|---|---|
| 2,872,120 | A * | 2/1959 | Weiland | G05D 23/025 236/102 |
| 3,335,951 | A * | 8/1967 | Roush | G05D 23/025 236/101 R |
| 4,190,198 | A * | 2/1980 | Casuga | F01M 5/007 236/34.5 |
| 4,973,024 | A * | 11/1990 | Homma | F16K 31/002 137/594 |
| 5,141,153 | A * | 8/1992 | Jeffress | F16K 31/002 137/614.18 |
| 5,791,557 | A * | 8/1998 | Kunze | G05D 23/022 236/34.5 |
| 6,126,818 | A * | 10/2000 | Duerrstein | B01D 35/12 137/118.06 |

(Continued)

FOREIGN PATENT DOCUMENTS

| | | |
|---|---|---|
| EP | 1 404 995 B1 | 4/2004 |
| JP | 3570055 B2 | 9/2004 |

*Primary Examiner* — Kun Kai Ma
(74) *Attorney, Agent, or Firm* — Morgan, Lewis & Bockius LLP

(57) ABSTRACT

A valve may include a housing forming one inlet and at least one outlet, an operating unit mounted in the housing, and performing expansion or contraction in accordance with a temperature of a flowing working fluid to selectively connect the at least outlet with the one inlet for exhausting the flowing working fluid outside of the housing, wherein the operating unit includes a sliding member slidably inserted into the interior of the housing, a flange member forming a penetration hole and fixedly mounted inside of the sliding member, a rod movably inserted into the penetration hole of the flange member, and a deformable member fixed at the penetration hole of the flange member and expanded or contracted in accordance with a temperature of the flowing working fluid.

12 Claims, 12 Drawing Sheets

(56) References Cited

U.S. PATENT DOCUMENTS

| | | | |
|---|---|---|---|
| 6,253,837 B1* | 7/2001 | Seiler | F16H 57/0413 |
| | | | 137/625.29 |
| 8,083,209 B2 | 12/2011 | Kozdras et al. | |
| 8,342,418 B2* | 1/2013 | Kanzaka | F01M 5/007 |
| | | | 236/93 R |
| 9,347,567 B2* | 5/2016 | Kim | F16K 1/40 |
| 2003/0136855 A1* | 7/2003 | Brown | F01M 5/007 |
| | | | 236/101 R |
| 2004/0232249 A1* | 11/2004 | Brown | F01M 5/007 |
| | | | 236/34.5 |
| 2007/0290056 A1* | 12/2007 | Fishman | F01P 7/16 |
| | | | 236/34.5 |
| 2009/0007972 A1* | 1/2009 | Lum | F16K 31/002 |
| | | | 137/468 |
| 2010/0126594 A1* | 5/2010 | Sheppard | F01P 7/16 |
| | | | 137/340 |
| 2010/0314457 A1* | 12/2010 | Todaka | F16K 11/07 |
| | | | 236/12.16 |
| 2012/0161042 A1* | 6/2012 | Sheppard | F01M 5/007 |
| | | | 251/11 |

* cited by examiner

<S1>

<S2>

<S10>

<S20>

<S100>

<S200>

VALVE

BACKGROUND OF THE INVENTION

Field of the Invention

The present invention relates to a valve. More particularly, the present invention relates to a valve which has simple composition and controls flow of fluid by selectively opening/closing an outlet in accordance with a temperature of fluid flowed into an interior thereof.

Description of the Related Art

Generally, a valve is installed on a pipe or a container, and is an apparatus which controls amount and pressure of fluid for passing or blocking fluid including a gas such as air or a liquid such as water in inflow or exhaust of fluid.

The valve is adapted to control a valve seat through which a common fluid passes by using a valve stem and a handle so as to regulate flow of fluid or to detect a temperature of fluid which flows through the valve seat by using an additional temperature control device such as thermostat so as to be remote-controlled.

However, the additional temperature control device must be applied to the conventional valve for controlling flow of fluid in accordance with a temperature of fluid. Therefore, the conventional valve has a complex composition, and the manufacturing cost thereof may be increased.

In addition, amount of fluid is not suitably controlled as quick control according to temperature of fluid is not easy, thus coolant flow is not smooth, cooling performance is deteriorated, and required power of a water pump is increased in case that a cooling system for a vehicle is applied.

Furthermore, the maintenance is not easy when the temperature control device is broken, and overall size and weight of the valve are increased.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention are directed to providing a valve having advantages of quickly opening/closing an outlet in accordance with temperature of a flowing fluid with a simple composition and controlling flow of the fluid such that constituent elements are simple compared with a conventional valve, a manufacturing cost thereof is decreased, size and weight are simultaneously decreased, valve opening/closing responsiveness is improved in accordance with a temperature of the fluid, and resistance of the fluid is small so as to maintain an amount of exhausted fluid such that reliability of a regulated amount of fluid is ensured.

In an aspect of the present invention, a valve may include a housing forming one inlet and at least one outlet, and adapted such that a fluid flows into an interior thereof through the one inlet, and an operating unit mounted in the housing, and performing expansion or contraction in accordance with a temperature of a flowing working fluid to selectively connect the at least outlet with the one inlet for exhausting the flowing working fluid outside of the housing, wherein the operating unit may include a sliding member adapted such that both ends thereof are opened, a first open hole and a second open hole are respectively formed at both sides corresponding to each other along a length direction thereof to correspond with the one inlet and the at least one outlet, and slidably inserted into the interior of the housing, a flange member forming a penetration hole at a center thereof, and fixedly mounted on a first end inside of the sliding member, a rod movably inserted into the penetration hole of the flange member, a deformable member adapted such that a first end thereof is fixed at the penetration hole of the flange member in a state of being engaged to a first end of the rod in the sliding member, and expanded or contracted in accordance with a temperature of the flowing working fluid to move the sliding member in the housing backward or forward on the rod, an elastic member interposed between the housing and the deformable member to provide an elastic force to the deformable member according to being compressed or expanded by the deformable member moved backward or forward on the rod, and an end cap mounted at an opened first end of the housing, and adapted to close the interior of the housing and to support a second end of the rod.

The deformable member is adapted such that a fixing ring is mounted at the first end thereof, and is fixed to the penetration hole of the flange member in the state of being inserted into the penetration hole of the flange member by the fixing ring.

A ring groove is formed along an exterior circumference of the first end of the deformable member such that the deformable member is fixed in the state that the fixing ring is inserted thereto.

The deformable member is formed of a wax material which is expanded or contracted in accordance with the temperature of the flowing working fluid.

The elastic member is formed as a coil spring of which a first end thereof is supported by a second end of the deformable member in a state of being inserted into the sliding member and a second end thereof being supported by the closed second end of the housing.

The end cap is fixed to the housing by a mounting ring which is fixedly mounted at an interior circumference of the opened a first end of the housing.

The mounting ring is fixedly mounted by a fixing groove which is formed along an interior circumference of the opened a first end of the housing.

The housing is formed in a cylindrical pipe shape of which a first end thereof is opened and a second end thereof is closed in the length direction, and the operating unit is mounted at the opened first end.

One outlet and the one inlet are provided to the housing and are formed at opposite sides of the housing in the length direction, and the outlet side is closed and the inlet side is opened to form a 2-way valve of which the operating unit is mounted to an interior thereof.

The one inlet is provided to the housing, the valve is a 3-way valve which may have a first outlet and a second outlet disposed with the inlet interposed therebetween and are respectively formed apart at the opposite side to that of the one inlet, and are adapted to be selectively connected with the one inlet by the operating unit.

The one inlet is provided to the housing, and the valve is a 4-way valve which may have a first outlet formed apart from the one inlet, a second outlet disposed between the one inlet and the first outlet and formed at the opposite side to that of the one inlet to exhaust the flowing working fluid, and a return port formed such that a working fluid return, and the first outlet, the second outlet, and the return port, are adapted to be connected with the one inlet by the operating unit.

The housing is formed in a cylindrical pipe shape of which both ends thereof are opened, and the operating units are mounted at respective sides of the housing to selectively connect the one inlet with the first outlet, the second outlet, or the return port.

A supporting member is mounted at the center of the housing for supporting each elastic member of the operating unit.

A flow hole for flowing the flowing working fluid into the one inlet is formed at the supporting member.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
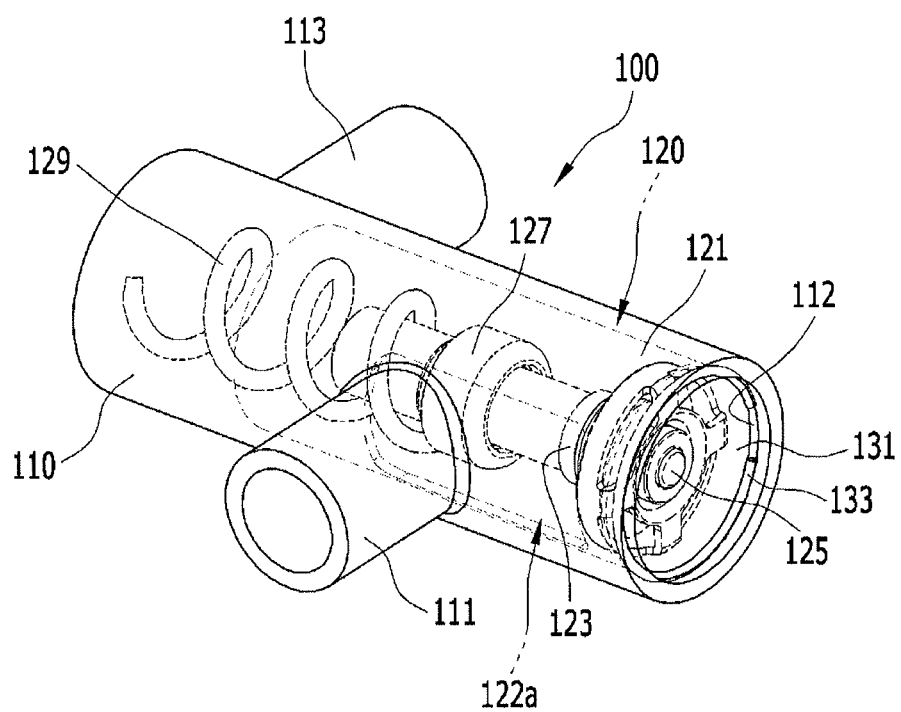
FIG. 1 is a schematic diagram of a valve according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

The scheme described in the specification is an exemplary embodiment of the present invention and it is to be understood that the invention is not limited to the disclosed embodiment, but, on the contrary, is intended to cover various modifications and equivalent arrangements included within the spirit and scope of the appended claims.

In addition, throughout the specification, unless explicitly described to the contrary, the word "comprise" and variations such as "comprises" or "comprising" will be understood to imply the inclusion of stated elements but not the exclusion of any other elements.

In addition, the terms " . . . unit", " . . . means", " . . . part", and " . . . member" described in the specification mean units of a general configuration performing at least one function or operation.

Figure 2:
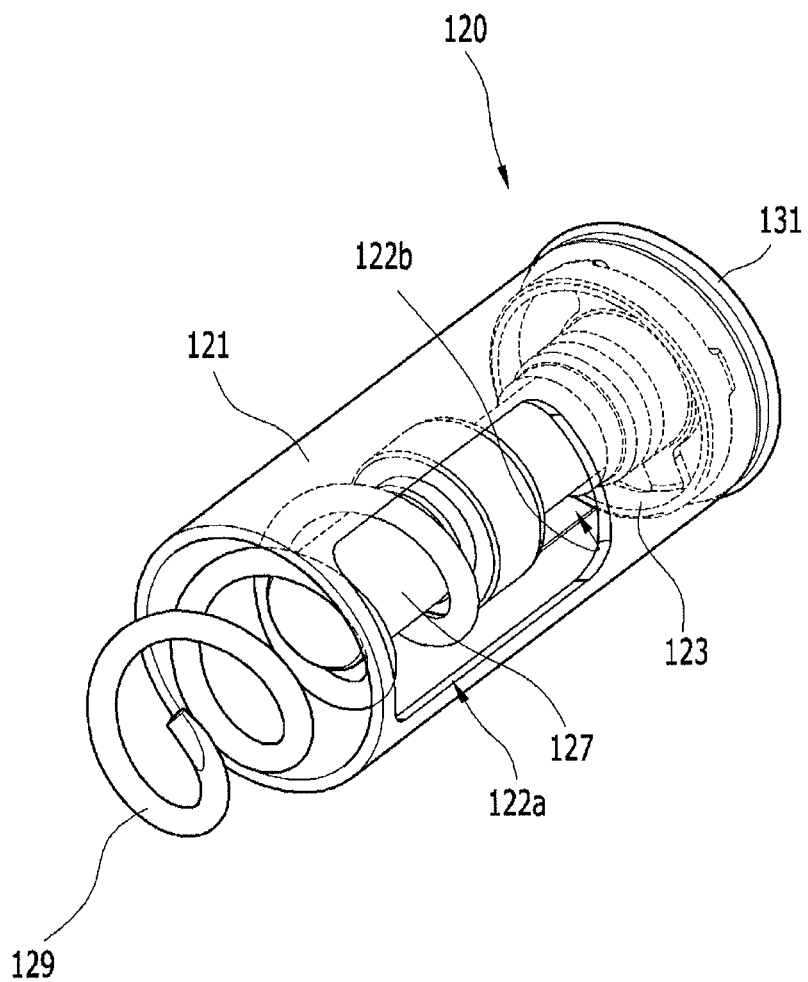
FIG. 2 is a perspective view of an operating unit applied to a valve according to various exemplary embodiments of the present invention.
Figure 3:
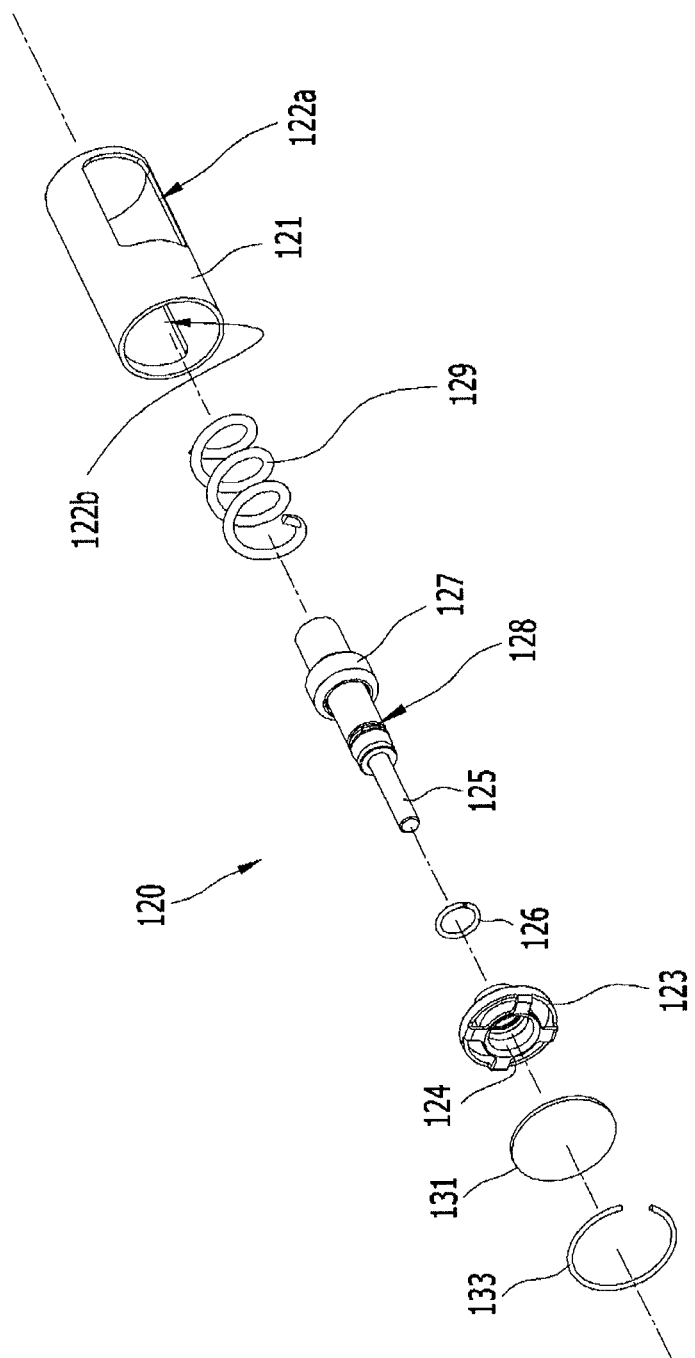
FIG. 3 is an exploded perspective view of an operating unit according to various exemplary embodiments of the present invention.
Figure 4:
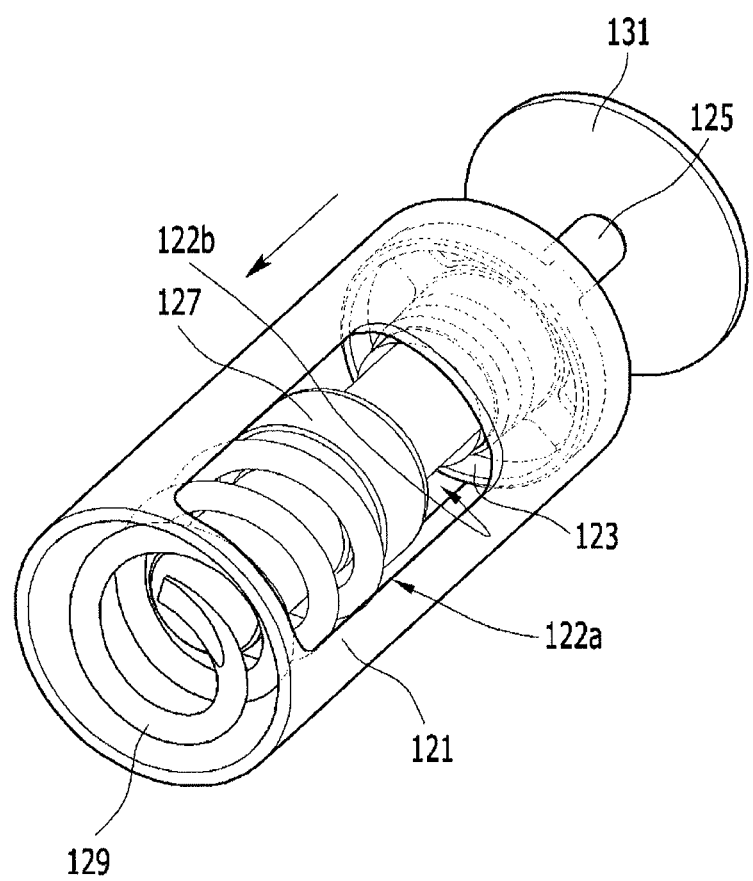
FIG. 4 is diagrams illustrating operations of an operating unit according to various exemplary embodiments of the present invention.

FIG. 1 is a schematic diagram of a valve according to a first exemplary embodiment of the present invention, FIG. 2 is a perspective view of an operating unit applied to a valve according to a first exemplary embodiment of the present invention, FIG. 3 is an exploded perspective view of an operating unit according to a first exemplary embodiment of the present invention, and FIG. 4 shows diagrams illustrating operations of an operating unit according to a first exemplary embodiment of the present invention.

Referring to the drawings, a valve 100 according to a first exemplary embodiment of the present invention has a simple composition, and quickly opens/closes an outlet in accordance with temperature of a fluid flowing therein so as to regulate flow of the fluid such that constituent elements became simple, the manufacturing cost is decreased, size and weight are simultaneously decreased, and resistance of fluid became small so as to maintain an amount of exhausted fluid such that reliability of regulating an amount of fluid compared with a conventional valve is increased.

For the above mentioned effect, the valve 100 according to an exemplary embodiment of the present invention includes a housing 110 and an operating unit 120 which are adapted to exhaust the working fluid flowed therein to the outside, as shown in FIG. 1.

The housing 110 forms one inlet 111 and at least one outlet 113, and fluid flows therein through the inlet 111.

Herein, the housing 110 is formed in a cylindrical pipe shape of which one end is opened and the other end is closed in a length direction thereof, and the operating unit 120 is mounted at the opened one end.

The housing 110 forms the inlet 111 at one side thereof in the length direction and forms the one outlet 113 which is disposed at the opposite side of the inlet 111 to correspond with the operating unit 120 mounted to the opened one end.

That is, the valve 100 according to the first exemplary embodiment of the present invention forms the inlet 111 and the outlet 113 which are provided at opposite sides in a length direction. In addition, the valve 100 may be a 2-way valve which is opened/closed by the inlet 111 being selectively connected with the outlet 113 by the operating unit 120 which is mounted therein.

The operating unit 120 is inserted into the opened one end of the housing 110, and is mounted in the housing 110.

The operating unit 120 performs expansion or contraction in accordance with temperature of the working fluid flowing in the valve 100 such that the outlet 113 and the inlet 111 are connected to each other so as to exhaust the working fluid flowing in the valve 100 to the outside of the housing 110.

As shown in FIG. 2, the operating unit 120 includes a sliding member 121, a flange member 123, a rod 125, a deformable member 127, an elastic member 129, and an end cap 131.

Both ends of the sliding member 121 are opened, and first and second open holes 122a and 122b are respectively formed at both sides of the sliding member 121 to correspond with the inlet 111 and the outlet 113 in a length direction. In addition, the sliding member 121 is slidably inserted into the interior of the housing 110.

A penetration hole 124 is formed at the center of the flange member 123, and the flange member 123 is fixedly mounted at one end of the inside of the sliding member 121.

The rod 125 is formed in a circular rod shape, and is movably inserted into the penetration hole 124 of the flange member 123.

One end of the deformable member 127 is fixed to the penetration hole 124 of the flange member 123 in the state that the deformable member 127 is inserted into one end of the rod 125 in the sliding member 121.

The deformable member 127 performs expansion or contraction in accordance with temperature of the working fluid so as to move backward or forward on the rod 125 such that the sliding member 121 connected by the flange member 123 is moved in the housing 110.

Herein, a fixing ring 126 is mounted at one end of the deformable member 127, and the deformable member 127 may be fixed to the penetration hole 124 of the flange member 123 in the state of being inserted into the penetration hole 124 of the flange member 123 by the fixing ring 126.

In addition, the deformable member 127 forms a ring groove 128 at an exterior circumference of the one end thereof so as to be fixed in the state that the fixing ring 126 is inserted thereto.

That is, the fixing ring 126 is inserted into the ring groove 128 so as to be fixed for preventing the deformable member 127 inserted into the flange member 123 from escaping from the flange member 123.

The deformable member 127 may be formed of a wax material which is expanded or contracted in accordance with the temperature of the working fluid.

Herein, the wax material expands or contracts in accordance with the temperature, such that the volume thereof is expanded as the temperature is increased and decreases to return to the original volume as the temperature is decreased.

Therefore, the temperature of the deformable member 127 is higher and the volume of the deformable member 127 is expanded in the case that the working fluid with a high temperature flows in through the inlet 111 such that the position of the deformable member 127 is changed from its original position where it is mounted to the rod 125 to the position where it is moved forward along the rod 125.

On the contrary, the temperature of the deformable member 127 is lower and the volume of the deformable member 127 is contracted in the case that the working fluid with a low temperature flows in in the above-mentioned state such that the deformable member 127 is moved backward along the rod 125 so as to return to its original position.

In addition, the position of the deformable member 127 is not changed when the deformable member 127 is not expanded or contracted in a case that the working fluid having a temperature which is lower than a predetermined temperature flows in in the original state in which the deformable member 127 is mounted to the rod 125.

According to the present exemplary embodiment, the elastic member 129 is interposed between the housing 110 and the deformable member 127, and performs compression or expansion by the deformable member 127 which is moved backward or forward on the rod 125 so as to provide elastic force to the deformable member 127.

Herein, the elastic member 129 may be a coil spring which is adapted such that one end thereof is supported by the other end of the deformable member 127 in the state of being inserted into the sliding member 121 and the other end thereof is supported by the closed other end of the housing 110.

The end cap 131 is mounted to the opened one end of the housing 110 and supports the rod 125, and simultaneously shuts the opened one end of the housing 110 such that interior thereof is closed.

Herein, the end cap 131 can be fixed to the housing 110 by a mounting ring 133, 233, and 333 which is fixedly mounted on the interior circumference of the opened one end of the housing 110.

The mounting ring 133, 233, and 333 can be fixedly mounted by a fixing groove 112 which is formed along the interior circumference of the opened one end of the housing 110.

As shown in FIG. 4, the operating unit 120 is operated such that the deformable member 127 is expanded and is moved forward from the rod 125 if the working fluid having a temperature which is equal to or higher than the predetermined temperature flows into the housing 110 through the inlet 111.

At this time, the sliding member 121 is slid together with the deformable member 127 in the housing 110 by the flange member 123 that the deformable member 127 is fixed to such that the second open hole 122b is positioned to the outlet 113 side.

Thus, the inlet 111 and the outlet 113 enter the state of being connected with each other through the first and second open holes 122a and 122b of the sliding member 121 such that the valve 100 is opened.

Herein, the elastic member 129 is compressed by the deformable member 127 which is moved forward on the rod 125 supported to the other end of the end cap 131.

In this state, the deformable member 127 is changed to contract if the working fluid having a temperature which is lower than the predetermined temperature flows into the housing 110 through the inlet 111.

Therefore, the deformable member 127 is moved backward on the rod 125, and returns to the original position as shown in FIG. 2.

At this time, the elastic member 129 provides elastic force to the deformable member 127 in the state of being compressed, and the deformable member 127 quickly returns to the original position by receiving the elastic force from the elastic member 129.

Hereinafter, operation and function of the valve 100 for a vehicle according to a first exemplary embodiment of the present invention will be described in detail.

Figure 5A:
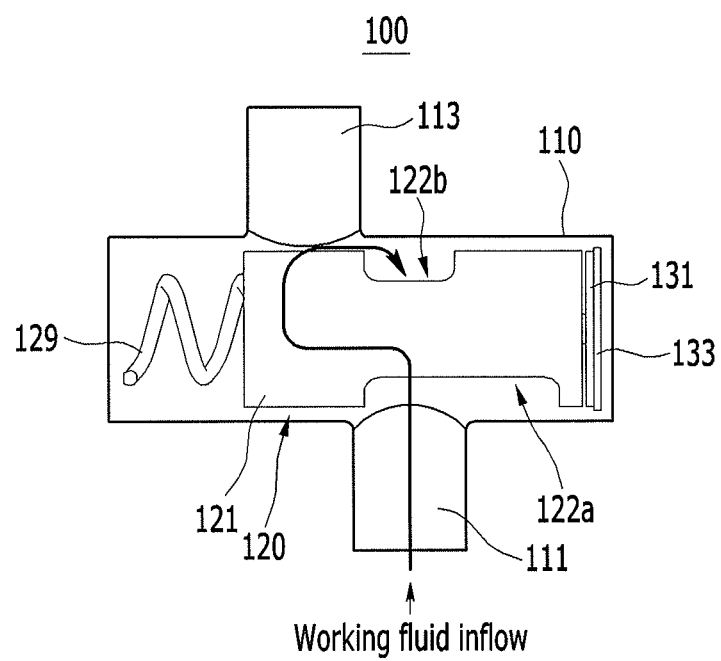
FIG. 5A and FIG. 5B show diagrams illustrating operation states of a valve according to various exemplary embodiments of the present invention in step.
Figure 5B:
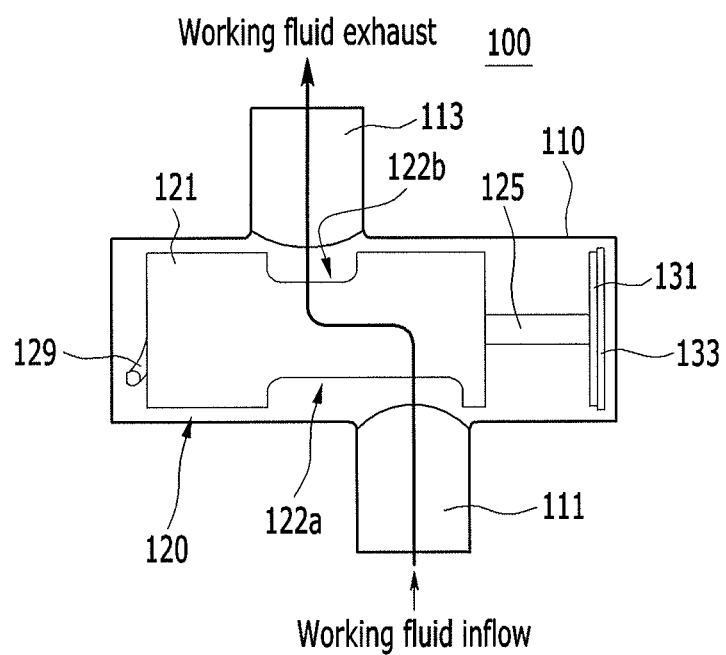

FIGS. 5A and 5B show diagrams illustrating operation states of a valve according to a first exemplary embodiment of the present invention in step.

As in the above-mentioned description, the operating unit 120 of which the sliding member 121, the flange member 123, the rod 125, the deformable member 127, and the elastic member 129 are assembled is inserted through the opened one end of the housing 110, and mounting the operating unit 120 is completed with the end cap 131.

At this time, the outlet 113 maintains the closed state and the first open hole 122a is positioned at the inlet 111 as the sliding member 121 is mounted in the state that the second open hole 122b is not positioned at the outlet 113.

In this state, the deformable member 127 maintains the original state to not be changed such as S1 shown in FIG. 5A if the working fluid having a temperature which is lower than the predetermined temperature flows in through the inlet 111.

Therefore, the working fluid is prevented from flowing into the housing 110 through the outlet 113 as the outlet 113 is closed by the sliding member 121.

On the contrary, the deformable member 127 is expanded so as to move forward on the rod 125 such as S2 shown in FIG. 5B if the working fluid having a temperature which is equal to or higher than the predetermined temperature flows through the inlet 111.

Simultaneously, the flange member 123 connected with the deformable member 127 is moved together with the deformable member 127, and the sliding member 121 is slid in the housing 110.

Therefore, the second open hole 122b is positioned at a home position at the outlet 113 such that the valve 100 is opened, and the working fluid flowing in through the first open hole 122a which is positioned at the inlet 111 is exhausted to the outside of the housing 110 through the outlet 113 via the second open hole 122b.

Meanwhile, the deformable member 127 is contracted and is quickly moved backward by elastic force of the elastic member 129 on the rod 125 if the working fluid having a temperature which is lower than the predetermined temperature flows in in the state that the valve 100 is opened as described above. Thus, the outlet 113 is closed as the second open hole 122b is not positioned at the outlet 113.

That is, the valve 100 according to a first exemplary embodiment of the present invention performs the operation to open/close the valve 100 by the deformable member 127 of the operating unit 120 that selectively opens/closes the outlet 113 in accordance with the temperature of the working fluid flowing in through the inlet 111.

Therefore, the deformable member 127 is expanded or contracted by a simple composition in accordance with the temperature of the fluid flowing in, and the outlet 113 is quickly opened/closed such that constituent elements can become simple, the manufacturing cost can be decreased, and weight can be simultaneously decreased compared with the conventional valve when the valve 100 according to the first exemplary embodiment of the present invention is applied.

In addition, the deformable member 127 is expanded or contracted in accordance with the temperature of the working fluid flowing in, responsiveness of opening/closing the valve is improved by using elastic force of the elastic member 129, and resistance of fluid is small so as to uniformly maintain an amount of exhausting fluid such that reliability of regulating the amount of fluid is improved.

Further, flow of coolant can be smooth, cooling performance of a vehicle can be improved, and required power of a water pump can be decreased in a case that the valve is applied to a cooling system for a vehicle and the working fluid is a coolant.

Furthermore, maintenance of the valve 100 is easy, and simultaneously the cost for repair can be decreased as constituent elements are simple.

Figure 6:
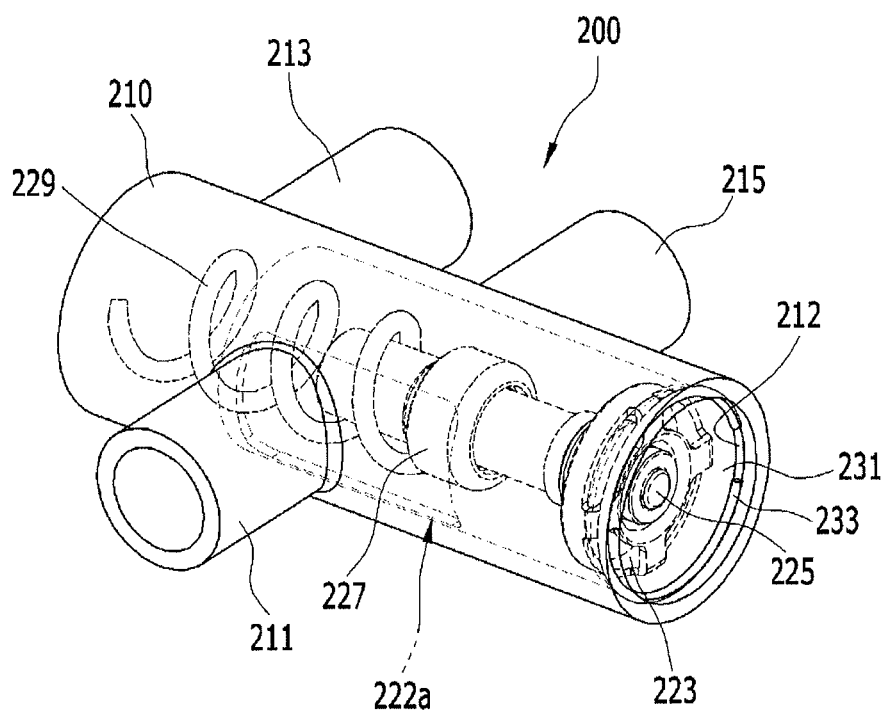
FIG. 6 is a schematic diagram of a valve according to various exemplary embodiments of the present invention.
Figure 7A:
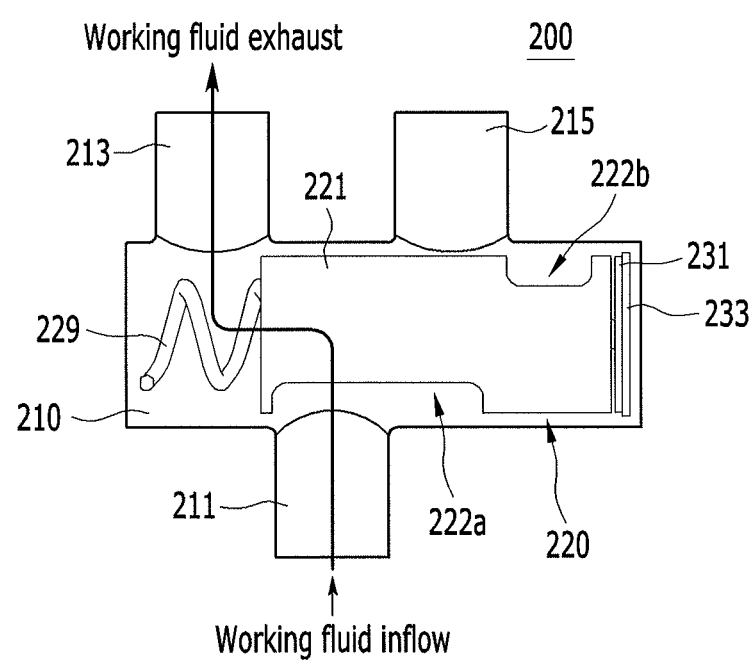
FIG. 7A and FIG. 7B show diagrams illustrating operation states of a valve according to various exemplary embodiments of the present invention in step.
Figure 7B:
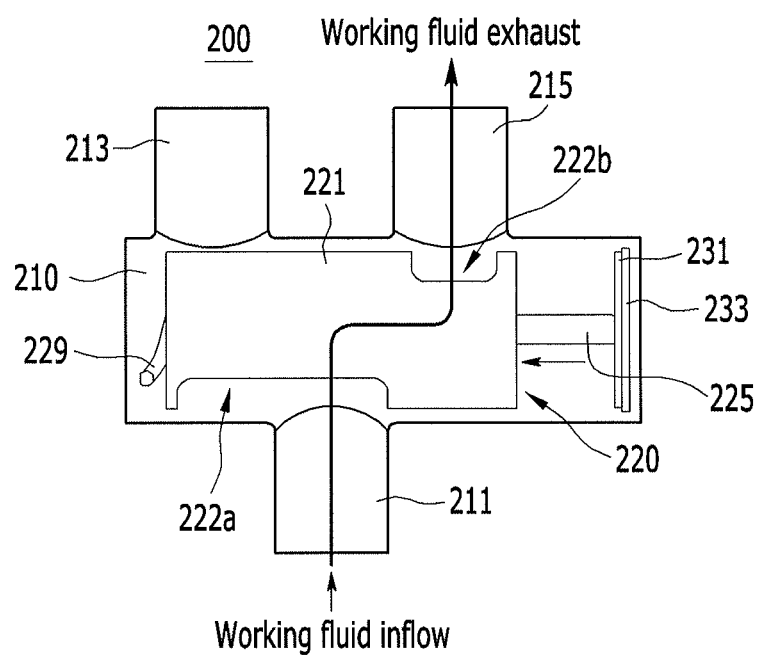

FIG. 6 is a schematic diagram of a valve according to a second exemplary embodiment of the present invention, and FIGS. 7A and 7B shows diagrams illustrating operation states of a valve according to the second exemplary embodiment of the present invention in step.

Referring to the drawings, a valve 200 according to a second exemplary embodiment of the present invention has a simple composition, and quickly opens/closes an outlet in accordance with temperature of a fluid flowing therein so as to regulate flow of fluid such that constituent elements are simple, the manufacturing cost is decreased, size and weight are simultaneously decreased, and resistance of fluid is small so as to maintain an amount of exhausted fluid such that reliability of regulating an amount of fluid compared with the conventional valve is increased.

For the above-mentioned effect, the valve 200 according to an exemplary embodiment of the present invention includes a housing 210 and an operating unit 220 which are adapted to exhaust the working fluid flowing therein to the outside as shown in FIG. 6.

The housing 210 forms one inlet 211 and at least one outlet 213, and fluid are flows therein through the inlet 211.

Herein, the housing 210 is formed in a cylindrical pipe shape of which one end is opened and the other end is closed in a length direction thereof, and the operating unit 220 is mounted at the opened one end.

The housing 210 forms the inlet 211 at one side thereof in a length direction, and respectively forms a first outlet 213 and a second outlet 215 at the opposite side of the inlet 211 with the inlet 211 interposed therebetween.

That is, the valve 200 has the one inlet 211 and the first and second outlets 213 and 215 which are respectively formed at an opposite side to the inlet 211, and is a 3-way valve in which the inlet 211 is selectively connected with the first outlet 213 or the second outlet 215 by the operating unit 220 mounted therein so as to be adapted to open/close.

The operating unit 220 is inserted into the opened one end of the housing 210 so as to be mounted in the housing 210.

The operating unit 220 performs expansion or contraction in accordance with a temperature of the working fluid flowing in such that the inlet 211 is connected with the first outlet 213 or the second outlet 215 so as to exhaust the working fluid flowing in the valve 200 to the outside of the housing 210.

Herein, the operating unit 220 is same as in the first exemplary embodiment. Therefore, a detailed description of composition and operation of the operating unit 220 will be omitted.

Hereinafter, the operation and function of the valve 200 for a vehicle according to the second exemplary embodiment of the present invention will be described.

FIGS. 7A and 7B show diagrams illustrating operation states of a valve according to the second exemplary embodiment of the present invention.

As in the above-mentioned description of the first exemplary embodiment, the operating unit 220 including a sliding member 221, a flange member 223, a rod 225, a deformable member 227, and an elastic member 229 is inserted through the opened one end of the housing 210, and mounting the operating unit 220 is completed with an end cap 231.

At this time, the outlet 213 maintains the closed state and the sliding member 221 is not positioned at the first outlet 213 such that the inlet 211 is connected with the first outlet 213 through a first open hole 222a so as to open the valve 200 as the sliding member 221 is mounted in the state that the second open hole 222b is not positioned at the outlet 213.

In this state, the deformable member 227 maintains the original state to not be changed such as S10 shown in FIG.

7A if the working fluid having a temperature which is lower than the predetermined temperature flows in through the inlet 211.

Therefore, the working fluid is prevented from flowing into the housing 210 through the second outlet 215 as the second outlet 215 is closed by the sliding member 221, and the working fluid is exhausted through the first outlet 213 which is connected with the inlet 211 through the first open hole 222a.

On the contrary, the deformable member 227 is expanded so as to move forward on the rod 225 such as S20 shown in FIG. 7B if the working fluid having a temperature which is equal to or higher than the predetermined temperature flows through the inlet 211.

Simultaneously, the flange member 223 connected with the deformable member 227 is moved together with the deformable member 227, and the sliding member 221 is slid in the housing 210.

Therefore, the second open hole 222b is positioned at a home position at the second outlet 215 such that the valve 200 is opened by the inlet 211 being connected with the second outlet 215, and the first outlet 213 maintains the state of being closed by the sliding member 221 which is moved forward.

Thus, the working fluid flows in through the first open hole 222a which is positioned at the inlet 211 and is exhausted through the second outlet 215 via the second open hole 222b.

Meanwhile, the deformable member 227 is changed to contract if the working fluid having a temperature which is lower than the predetermined temperature flows in in the state that the deformable member 227 of the valve 200 is expanded as described above.

Then, the deformable member 227 is quickly moved backward on the rod 225 by elastic force of the elastic member 229 such that the second open hole 222b is not positioned at the second outlet 215 so as to close the second outlet 215 and again open the first outlet 213.

That is, the valve 200 according to a second exemplary embodiment of the present invention performs the operation to open/close the valve 100 by the first and second outlets 213 and 215 being selectively connected with the inlet 211 through the first and second open holes 222a and 222b of the sliding member 221 being opened/closed by the deformable member 227 of the operating unit 220 in accordance with the temperature of the working fluid flowing in through the inlet 211.

Therefore, the deformable member 227 is expanded or contracted by a simple composition in accordance with temperature of the fluid flowing in, and the outlet 213 is quickly opened/closed such that constituent elements can be simple, the manufacturing cost can be decreased, and weight can be simultaneously decreased compared with the conventional valve when the valve 200 according to a second exemplary embodiment of the present invention is applied.

In addition, the deformable member 227 is expanded or contracted in accordance with the temperature of the working fluid flowing in, responsiveness of opening/closing the valve is improved by using elastic force of the elastic member 229, and resistance of fluid is small so as to uniformly maintain an amount of exhausting fluid such that reliability of regulating the amount of fluid is improved.

Further, flow of coolant can be smooth, cooling performance of a vehicle can be improved, and the required power of a water pump can be decreased in a case that the valve is applied to a cooling system for a vehicle and the working fluid is a coolant.

Furthermore, the maintenance of the valve 200 is easy, and simultaneously the cost for repair can be decreased as constituent elements are simple.

Figure 8:
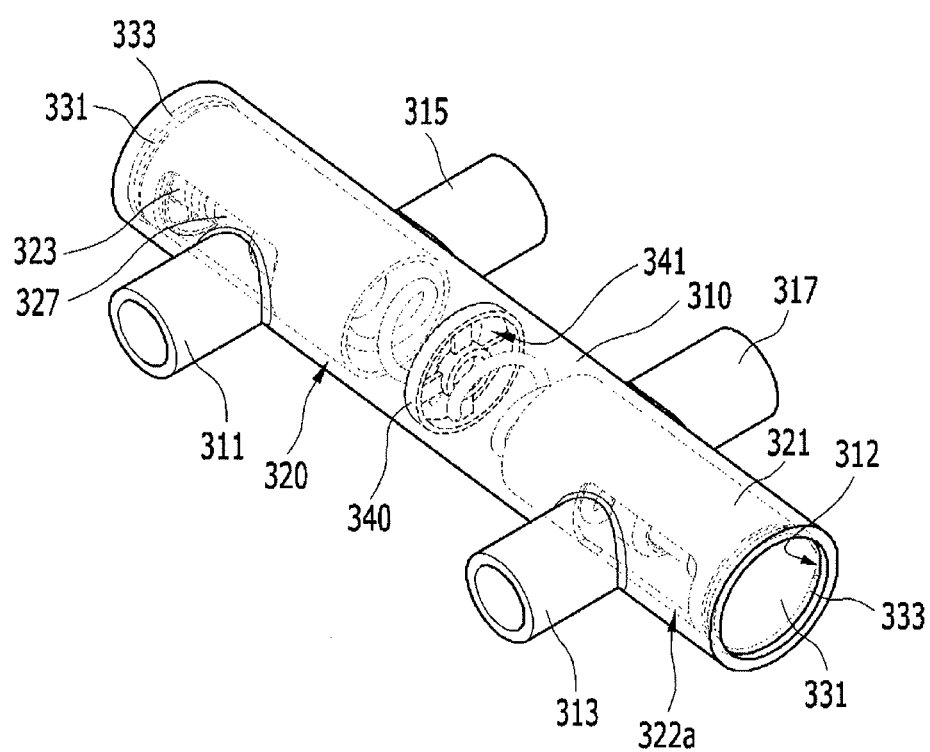
FIG. 8 is a schematic diagram of a valve according to various exemplary embodiments of the present invention.
Figure 9A:
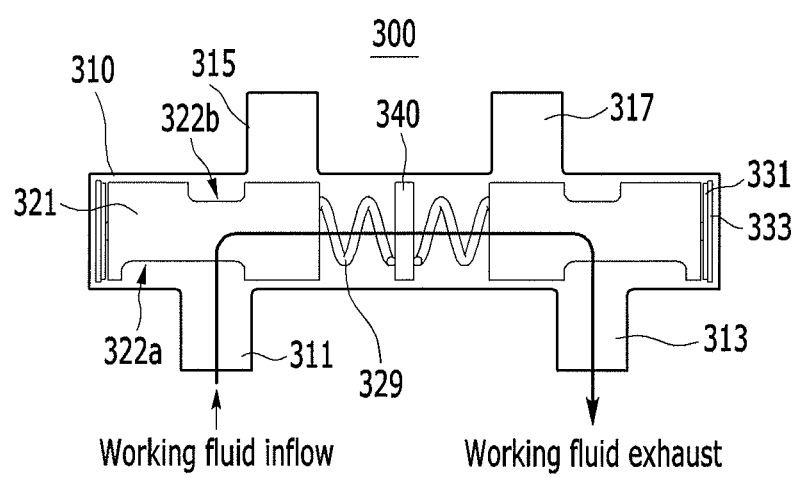
FIG. 9A and FIG. 9B show diagrams illustrating operation states of a valve according to various exemplary embodiments of the present invention in step.
Figure 9B:
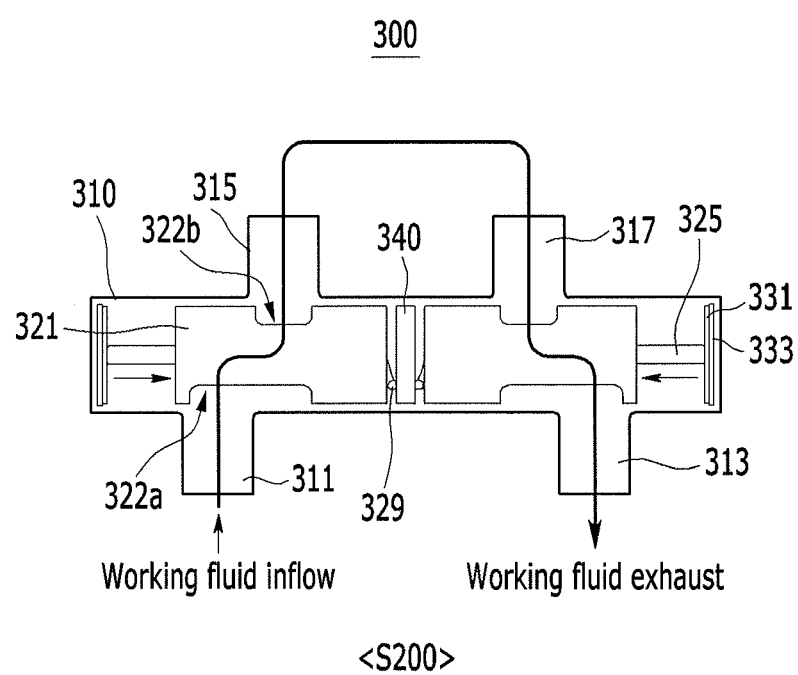

FIG. 8 is a schematic diagram of a valve according to a third exemplary embodiment of the present invention, and FIGS. 9A and 9B shows diagrams illustrating operation states of a valve according to the third exemplary embodiment of the present invention.

Referring to the drawings, a valve 300 according to a third exemplary embodiment of the present invention has a simple composition, and quickly opens/closes an outlet in accordance with a temperature of fluid flowing therein so as to regulate flow of fluid such that constituent elements are simple, the manufacturing cost is decreased, size and weight are simultaneously decreased, and resistance of fluid is small so as to maintain an amount of exhausted fluid such that reliability of regulating the amount of fluid to compared with the conventional valve is increased.

For the above-mentioned effect, the valve 300 according to an exemplary embodiment of the present invention includes a housing 310 and an operating unit 320 which are adapted to exhaust the working fluid flowing therein to the outside as shown in FIG. 8.

The housing 310 forms one inlet 311 and at least one outlet 313, and fluid flows therein through the inlet 311.

One inlet 311 is disposed at the housing 310. The housing 310 includes a first outlet 313 which is formed apart from the inlet 311, a second outlet 315 which is formed at an opposite side of the inlet 311 between the inlet 311 and the first outlet 313, and a return port 317 which is adapted to return the working fluid. In addition, the second outlet 315 and the return port 317 are disposed apart from each other.

The second outlet 315 and the return port 317 are connected with a non-illustrated additional supply unit for supplying the working fluid to the supply unit and returning the working fluid from the supply unit. The supply unit may be a heat exchanger which includes a condenser, a cooler, and so on.

Herein, the housing 310 is formed in a cylindrical pipe shape of which both sides thereof are opened, and the operating unit 320 is respectively mounted at both sides so as to selectively connect the inlet 311 with the first outlet 313, the second outlet 315, or the return port 317.

That is, the valve 300 has the one inlet 311, the first outlet 313 which is formed apart from the inlet 311, and the second outlet 315 and the return port 317 which are formed apart from each other between the inlet 311 and the first outlet 313 at the opposite side of the inlet 311. Further, the valve 300 may be a 4-way valve in which the inlet 311 is connected with the first outlet 313, the second outlet 315, or the return port 317 by the operating unit 220 which is respectively mounted at both sides of the housing 310 in the housing 310 so as to selectively open/close the first outlet 313, the second outlet 315, and the return port 317.

The operating units 320 are respectively inserted into the opened both ends of the housing 310 so as to be mounted in the housing 310.

The operating unit 220 performs expansion or contraction in accordance with a temperature of the working fluid flowing in such that the first outlet 313, the second outlet 315, or the return port 317 is selectively connected with the inlet 311 so as to exhaust the working fluid flowing in to the outside of the housing 110.

Herein, the operating unit 320 is the same as in the first exemplary embodiment. Therefore, a detailed description of the composition and operation of the operating unit 320 will be omitted.

Meanwhile, supporting members 340 are fixedly mounted to the center in the housing 310 for respectively supporting one end of each elastic member 329 of the operating units 320.

The supporting member 340 forms a flow hole 341 for flowing the working fluid such that the working fluid flowing in the housing 310 smoothly flows.

That is, the working fluid flows through the inlet 311 and is exhausted through the first outlet 313 via the flow hole 341 when the second outlet 315 and the return port 317 are closed by each operating unit 320.

Hereinafter, operation and function of the valve 300 for a vehicle according to the third exemplary embodiment of the present invention will be described in detail.

FIGS. 9A and 9B show diagrams illustrating operation states of a valve according to the third exemplary embodiment of the present invention.

As in the above-mentioned description, the operating unit 320 including a sliding member 321, a flange member 323, a rod 325, a deformable member 327, and the elastic member 329 is inserted through the opened one end of the housing 310, and mounting the operating unit 320 is completed with an end cap 331.

At this time, the second outlet 315 and the return port 317 are maintained to be closed as each sliding member 321 of the operating units 320 which are respectively mounted at both sides of the housing 310 is mounted in the state that a second open hole 322b is not positioned at the second outlet 315 and the return port 317.

On the first outlet 313, the inlet 311 and the first outlet 313 are connected with each other by each first open hole 322a so as to open as the first open hole 322a of a sliding member 312 is positioned at the opposite side of the inlet 311.

In this state, the deformable member 327 maintains the original state to not be changed such as S100 shown in FIG. 9A if the working fluid having a temperature which is lower than the predetermined temperature flows in through the inlet 311.

Therefore, the working fluid is prevented from flowing into the housing 310 through the second outlet 315 and the return port 317 as the second outlet 315 and the return port 317 are closed by each sliding member 321, and the working fluid is exhausted through the first outlet 213 which is connected with the inlet 311 through the first open hole 322a.

At this time, the working fluid smoothly flows from the inlet 311 toward the first outlet 313 through the flow hole 341 of the supporting member 340.

On the contrary, each deformable member 327 of the operating units 320 which are mounted at both sides is expanded so as to move toward the center of the housing 310 on the rod 325 such as S200 shown in FIG. 9B if the working fluid having a temperature which is equal to or higher than the predetermined temperature flows through the inlet 311.

Simultaneously, the flange member 323 connected with the deformable member 327 is moved together with the deformable member 327, and the sliding member 321 is slid in the housing 310.

Therefore, the second open holes 322b are respectively positioned at a home position at the second outlet 315 and the return port 317 such that the valve 300 is opened by the inlet 311 being connected with the second outlet 315 and the return port 317.

At this time, the first outlet 313 is positioned at the first open hole 322 so as to maintain the state of being opened even though the sliding member 321 moves forward.

Thus, the working fluid flows in through the first open hole 322a which is positioned at the inlet 311 and is exhausted to a non-illustrated supply unit through the second outlet 315 via the second open hole 322b.

The working fluid passing through the supply unit flows again into the housing 310 through the return port 317 and is exhausted to the outside of the housing 310 through the first outlet 313.

Meanwhile, the deformable member 327 is changed to contract if the working fluid having a temperature which is lower than the predetermined temperature flows in in the state that the deformable member 327 of the valve 300 is expanded as described above.

Then, each deformable member 327 is quickly moved backward on the rod 325 by elastic force of each elastic member 329 such that the second open hole 322b is not positioned at the second outlet 315 and the return port 317 so as to close the second outlet 315 and the return port 317.

That is, the valve 300 according to the third exemplary embodiment of the present invention performs the operation to open/close the valve 300 by the second outlet 315 and the return port 317 being selectively connected with the inlet 311 and the first outlet 313 through the first and second open holes 322a and 322b of each sliding member 321 to be opened/closed by the deformable member 327 of the operating unit 320 in accordance with the temperature of the working fluid flowing in through the inlet 311.

Therefore, the deformable member 327 is expanded or contracted by a simple composition in accordance with the temperature of the fluid flowing in and the outlet 313 is quickly opened/closed such that constituent elements can be simple, the manufacturing cost can be decreased, and weight can be simultaneously decreased compared with the conventional valve when the valve 300 according to the third exemplary embodiment of the present invention is applied.

In addition, the deformable member 327 is expanded or contracted in accordance with the temperature of the working fluid flowing in, responsiveness of opening/closing the valve is improved by using elastic force of the elastic member 329, and resistance of the fluid is small so as to uniformly maintain the amount of exhausting fluid such that reliability of regulating the amount of fluid is improved.

Further, flow of coolant can be smooth, cooling performance of a vehicle can be improved, and required power of a water pump can be decreased when the valve is applied to a cooling system for a vehicle and the working fluid is a coolant.

Furthermore, the maintenance of the valve 300 is easy, and simultaneously, the cost for repair can be decreased as constituent elements are simple.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A valve comprising:
a housing forming one inlet and at least one outlet including a first outlet and a second outlet, and adapted such that a fluid flows into an interior thereof through the one inlet; and
an operating unit mounted in the housing, and performing expansion or contraction in accordance with a temperature of a flowing working fluid to selectively connect the at least one outlet with the one inlet for exhausting the flowing working fluid outside of the housing,
wherein the operating unit comprises:
a sliding member adapted such that both ends thereof are opened, a first open hole and a second open hole are respectively formed at both sides corresponding to each other along a length direction thereof to correspond with the one inlet and the at least one outlet, and slidably inserted into the interior of the housing;
a flange member forming a penetration hole at a center thereof, and fixedly mounted on a first end inside of the sliding member;
a rod movably inserted into the penetration hole of the flange member;
a deformable member adapted such that a first end thereof is fixed at the penetration hole of the flange member in a state of being engaged to a first end of the rod in the sliding member, and expanded or contracted in accordance with a temperature of the flowing working fluid to move the sliding member in the housing backward or forward on the rod;
an elastic member interposed between the housing and the deformable member to provide an elastic force to the deformable member according to being compressed or expanded by the deformable member moved backward or forward on the rod; and
an end cap mounted at an opened first end of the housing, and adapted to close the interior of the housing and to support a second end of the rod,
wherein the one inlet is provided to the housing, and the valve is a 4-way valve which has the first outlet formed apart from the one inlet, the second outlet disposed between the one inlet and the first outlet and formed at the opposite side to that of the one inlet to exhaust the flowing working fluid, and a return port formed such that a working fluid return, and the first outlet, the second outlet, and the return port, are adapted to be connected with the one inlet by the operating unit, and
wherein the housing is formed in a cylindrical pipe shape of which both ends thereof are opened, and the operating units are mounted at respective sides of the housing to selectively connect the one inlet with the first outlet, the second outlet, or the return port.

2. The valve of claim 1, wherein the deformable member is adapted such that a fixing ring is mounted at the first end thereof, and is fixed to the penetration hole of the flange member in the state of being inserted into the penetration hole of the flange member by the fixing ring.

3. The valve of claim 2, wherein a ring groove is formed along an exterior circumference of the first end of the deformable member such that the deformable member is fixed in the state that the fixing ring is inserted thereto.

4. The valve of claim 1, wherein the deformable member is formed of a wax material which is expanded or contracted in accordance with the temperature of the flowing working fluid.

5. The valve of claim 1, wherein the elastic member is formed as a coil spring of which a first end thereof is supported by a second end of the deformable member in a state of being inserted into the sliding member and a second end thereof being supported by the closed second end of the housing.

6. The valve of claim 1, wherein the end cap is fixed to the housing by a mounting ring which is fixedly mounted at an interior circumference of the opened first end of the housing.

7. The valve of claim 6, wherein the mounting ring is fixedly mounted by a fixing groove which is formed along an interior circumference of the opened first end of the housing.

8. The valve of claim 1, wherein the housing is formed in a cylindrical pipe shape of which a first end thereof is opened and a second end thereof is closed in the length direction, and the operating unit is mounted at the opened first end.

9. The valve of claim 1, wherein one outlet and the one inlet are provided to the housing and are formed at opposite sides of the housing in the length direction, and the outlet side is closed and the inlet side is opened to form a 2-way valve of which the operating unit is mounted to an interior thereof.

10. The valve of claim 1, wherein the one inlet is provided to the housing, the valve is a 3-way valve which has a first outlet and a second outlet disposed with the inlet interposed therebetween and are respectively formed apart at the opposite side to that of the one inlet, and are adapted to be selectively connected with the one inlet by the operating unit.

11. The valve of claim 1, wherein a supporting member is mounted at the center of the housing for supporting each elastic member of the operating unit.

12. The valve of claim 11, wherein a flow hole for flowing the flowing working fluid into the one inlet is formed at the supporting member.

* * * * *